United States Patent
Ollis et al.

(10) Patent No.: US 8,045,688 B2
(45) Date of Patent: Oct. 25, 2011

(54) METHOD AND SYSTEM FOR PRESENTING CUSTOMIZED CALLER OPTIONS VIA A COMMUNICATION DEVICE

(75) Inventors: Jeffrey D. Ollis, Dresher, PA (US); John M. Coogan, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 1344 days.

(21) Appl. No.: 11/612,281

(22) Filed: Dec. 18, 2006

(65) Prior Publication Data

US 2008/0144790 A1 Jun. 19, 2008

(51) Int. Cl.
H04M 1/56 (2006.01)

(52) U.S. Cl. ......... 379/142.01; 379/142.09; 379/102.01; 379/88.11

(58) Field of Classification Search .............. 379/142.01–142.09, 67.1, 102.01, 379/74, 88.11–88.12, 88.22
See application file for complete search history.

(56) References Cited

U.S. PATENT DOCUMENTS

| | | | |
|---|---|---|---|
| 6,292,543 B1 * | 9/2001 | Cannon et al. | 379/67.1 |
| 2001/0036253 A1 * | 11/2001 | Heinzman | 379/67.1 |
| 2002/0076026 A1 * | 6/2002 | Batten | 379/210.02 |
| 2004/0208297 A1 * | 10/2004 | Valentine | 379/88.19 |
| 2006/0140356 A1 * | 6/2006 | Bossemeyer et al. | 379/88.1 |
| 2007/0258577 A1 * | 11/2007 | Hamilton et al. | 379/266.01 |

FOREIGN PATENT DOCUMENTS

| | | |
|---|---|---|
| EP | 0884885 | 12/1998 |
| JP | 5-219183 | 8/1993 |
| JP | 8-111723 | 4/1996 |
| JP | 11-168774 | 6/1999 |

OTHER PUBLICATIONS

"Speech-Activated Telephone Answering System", IBM Technical Disclosure Bulletin, IBM Corp., New York, US, vol. 38, No. 7. Dated Jul. 1995. pp. 557-558, XP000521792. ISSN: 0018-8689.
EPC Search Report, RE: Application #07023146.9-2414 May 2, 2008.
Office Action, Mexican App. No. MX/a/2007/016153 (Foreign Text), Mar. 2, 2010.
Office Action, Canadian App. No. 2,614,644, Oct. 30, 2009.
Office Action, Korean App. No. 10-2007-132328 (Foreign Text), Feb. 27, 2009.
Office Action, Korean App. No. 10-2007-132328 (English Translation), Mar. 19, 2009.
Office Action, Japanese App. No. 2007-325471 (Foreign Text and English Translation), Sep. 14, 2010.

* cited by examiner

*Primary Examiner* — Melur Ramakrishnaiah
(74) *Attorney, Agent, or Firm* — Stewart M. Wiener (57) ABSTRACT

A method and a system for presenting customized caller options via a communication device (104) are disclosed. The method includes receiving (404) an incoming call from a calling party at the second communication device. The method further includes comparing (406) a caller Identification (ID) information associated with the incoming call to a pre-defined stored list of caller ID information. Further, the method includes presenting (408) the calling party with customized caller options. The customized caller options are presented as a function of the comparison between the incoming call caller ID information and the pre-defined stored list of caller ID information.

22 Claims, 6 Drawing Sheets

METHOD AND SYSTEM FOR PRESENTING CUSTOMIZED CALLER OPTIONS VIA A COMMUNICATION DEVICE

The present invention generally relates to a communication device, and more particularly, to presenting customized caller options via the communication device.

BACKGROUND OF THE INVENTION

Communication devices have emerged as one of the most important tools to enable exchange of voice and information. Communication devices can transmit and receive voice, data and information from other communication devices in the communication network. Examples of a communication device can include a mobile phone, a smart phone, an answering machine, a modem, a wired phone, a pager, and a Personal Digital Assistant (PDA). Various technologies can be used by a communication device to transfer data or voice. Examples of such technologies can be a Public Switched Telephone Network (PSTN), a Global System for Mobile communications (GSM), a Universal Mobile telecommunications Service (UMTS) and a General Packet Radio Service (GPRS).

In a communication network, a communication device can be remotely accessed by a user to access data or information present on the communication device. For example, when the communication device receives an incoming call, either the incoming call can be attended at the communication device or it can remain unattended. When the call is unattended, a pre-recorded message can be played and conveyed to the caller, informing the caller about the absence or unavailability of owner of the communication device. The pre-recorded message can be a greeting message, a welcome message and the like, which has been recorded by the owner of the communication device. After the execution of the pre-recorded message either the user can record a message or can enter an access code to gain access to the communication device.

In the existing systems, the owner of the communication device can not customize the pre-recorded message. Further, the owner of the communication device cannot select and assign different pre-recorded messages for different callers. The owner can remotely access the communication device to access messages recorded by other callers. When the owner of the communication device tries to access the recorded messages, the same pre-recorded message is executed. The owner then enters an access code to gain access to the messages at the communication device. Such a practice consumes a lot of time as the owner of the communication device is not required to hear the pre-recorded message.

Further, the size of the access codes entered by a remote user is usually kept small so that the owner of the communication device remembers it. The small size of the access code makes the access code prone to being hacked and hence raises security issues.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help to improve an understanding of embodiments of the present invention.

DETAILED DESCRIPTION

Before describing in detail the particular method and system for presenting a customized menu by a communication device, in accordance with various embodiments of the present invention, it should be observed that the present invention resides primarily in combinations of the method steps related to presenting the customized menu by the communication device. Accordingly, the system components and method steps have been represented, where appropriate, by conventional symbols in the drawings, showing only those specific details that are pertinent for an understanding of the present invention, so as not to obscure the disclosure with details that will be readily apparent to those of ordinary skill in the art, having the benefit of the description herein.

In this document, the terms "comprises," "comprising," or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by "comprises . . . a" does not, without more constraints, preclude the existence of additional identical elements in the process, method, article or apparatus that comprises the element. The term "another," as used in this document, is defined as at least a second or more. The terms "includes" and/or "having", as used herein, are defined as comprising. The term 'coupled,' as used herein with reference to electro-optical technology, is defined as connected, although not necessarily directly or mechanically. The term 'program,' as used herein, is defined as a sequence of instructions designed for execution on a computer system. A 'program,' or 'computer program,' may include a subroutine, a function, a procedure, an object method, an object implementation, an executable application, an applet, a servlet, a source code, an object code, a shared library/dynamic load library and/or other sequence of instructions designed for execution on a computer system.

For one embodiment, a method for responsively presenting customized caller options via a communication device is provided. The method includes receiving an incoming call from a calling party at the communication device. The method further includes comparing a caller Identification (ID) information associated with the incoming call to a predefined stored list of caller ID information. Further, the method includes presenting the calling party with customized caller options. The customized caller options are presented as a function of the comparison between the incoming call caller ID information and the pre-defined stored list of caller ID information.

For another embodiment, a communication device is provided. The communication device includes a receiver, a memory, and a processor. The receiver is adapted to receive an incoming call from a calling party. The memory stores a pre-defined list of caller Identification (ID) information. The processor is adapted to compare a caller ID information associated with the incoming call to a pre-defined list of caller ID information which is stored in the memory. The processor is further adapted to responsively present the calling party with customized caller options as a function of that comparison.

For another embodiment, a Base Transceiver Station (BTS) is provided. The BTS includes a receiver, a memory, and a processor. The receiver is adapted to receive a request for calling a communication device from a calling party. The memory stores a pre-defined list of caller Identification (ID) information. The processor is adapted to compare a caller ID information associated with the call request to the pre-defined list of caller ID information which is stored in the memory. The processor is also adapted to responsively present the calling party with customized caller options as a function of that comparison.

Figure 1:
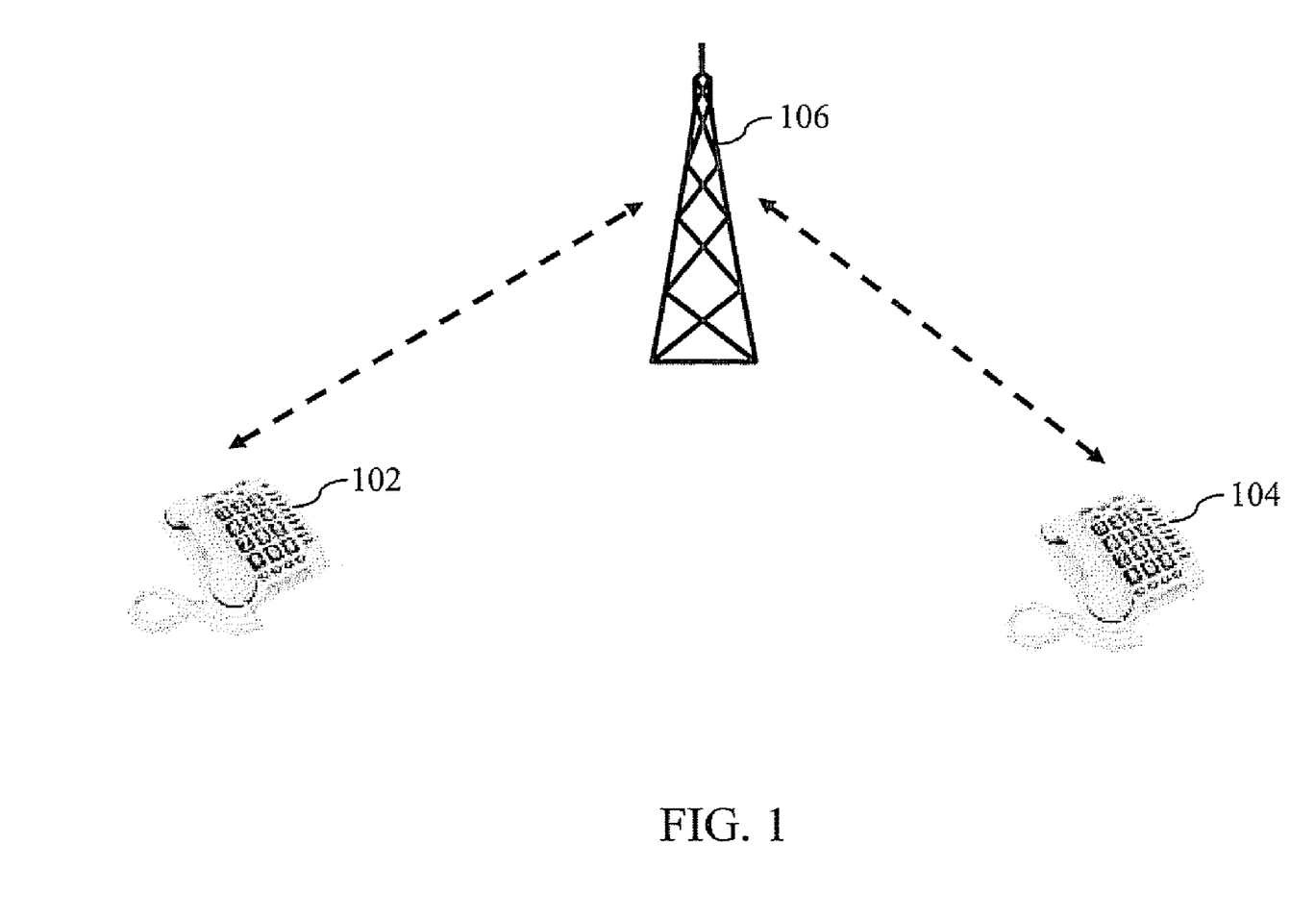
FIG. 1 illustrates an exemplary communication network, in accordance with various embodiments of the present invention.

FIG. 1 illustrates an exemplary communication network 100, in accordance with various embodiments of the present invention. The communication network 100 is a network of two or more communication devices that can exchange information or data. The communication network 100 includes a first communication device 102, a second communication device 104, and a Base Transceiver System (BTS) 106. It should be appreciated that although the FIG. 1 depicts the first communication device 102, the second communication device 104, and the BTS 106, it will be apparent to a person ordinarily skilled in the art that the present invention may include a plurality of communication devices and a plurality of BTSs. The BTS 106 aids communication between the first communication device 102 and the second communication device 104 in the communication network 100. For example, the first communication device 102 can transmit a communication session to the second communication device 104 through the BTS 106. The BTS 106 routes the communication session from the first communication device 102 to the second communication device 104. The first communication device 102 and the second communication device 104 can have one or more customized caller options which can be presented to a calling party. The calling party can be a user at the first communication device 102. Examples of the customized caller options include, but are not limited to, privileged caller options, special caller options, and default caller options. The default caller options are executed when a call is not attended at the second communication device 102. For example, a calling party may call at the second communication device 104 and the owner of the second communication device 104 may not be able to attend the call at that time. The second communication device 104 provides a list of options to the calling party using which the calling party can record and store a message at the second communication device 104. The owner of the second communication device 104 can play the message and may take an action based on the message at a later time.

Though the first communication device 102 and the second communication device 104 are depicted as fixed phones in the FIG. 1, it will be apparent to a person ordinarily skilled in the art that the first communication device 102 and the second communication device 104 can be any other communication device such as mobile phones, modems, smart phones, wired phones, pagers, Personal Digital Assistants (PDAs), and the like. The first communication device 102 and the second communication device 104 can communicate with each other in a communication network 100. Examples of the communication network 100 include, but are not limited to, a Local Area Network (LAN), a Wide Area Network, a Public Switched Telephone Network (PSTN), a Wireless Fidelity Network (Wi-Fi), a High Performance Radio Local Area Network (HIPERLAN), and the like. Various technologies can be used by the first communication device 102 and the second communication device 104 to transfer data or information. Examples of such technologies can be a Public Switched Telephone Network (PSTN), Global System for Mobile communications (GSM), a Universal Mobile telecommunications Service (UMTS) and a General Packet Radio Service (GPRS).

Figure 2:
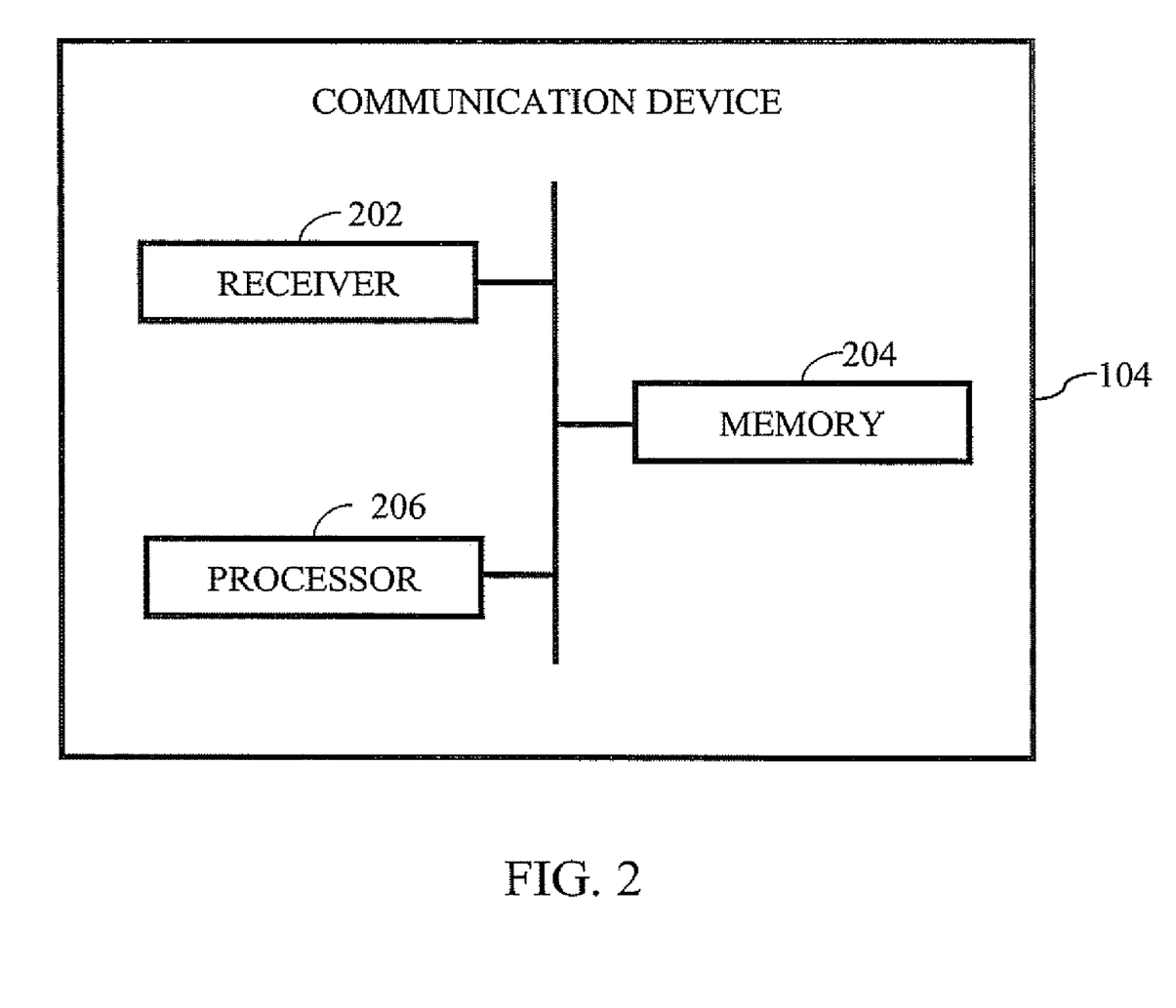
FIG. 2 illustrates a block diagram of an exemplary communication device, in accordance with various embodiments of the present invention.

FIG. 2 illustrates a block diagram of the second communication device 104, in accordance with various embodiments of the present invention. Examples of the second communication device 104 include mobile phones, modems, smart phones, wired phones, pagers, Personal Digital Assistants (PDAs), and the like. The second communication device 104 includes a receiver 202, a memory 204, and a processor 206. The receiver 202 is adapted to receive an incoming call from a calling party. For example, the second communication device 104 can receive an incoming call from the first communication device 102, as referred to in FIG. 1. The calling party can be a user at other communication device. For example, the calling party can be a user at the first communication device 102. The receiver 202 is also adapted to accept an access code from the calling party. The calling party can gain remote access to the second communication device 104 by entering an authorized access code. The calling party is authenticated based on the access code at the second communication device 104. Examples of the access code include, but are not limited to, a numeric code, an alphanumeric code, a sequence of tones, a set of characters, and a biometric sample.

The memory 204 stores a pre-defined list of caller Identification (ID) information. The memory 204 can also store other information, for example a pre-defined list of authorized access codes, a voice message, customized caller options, and the like. The voice message is a message that is recorded by the calling party. For an embodiment of the present invention, the pre-defined list of caller ID information can be stored at the BTS 106. The pre-defined list of caller ID information can contain at least two classes of caller ID information. The classes of the caller ID information can include a privileged user class, a special user class, an ordinary user class, and the like. The privileged user class can contain caller ID information of one or more privileged users. The special user class can contain caller ID information of one or more special users. A privileged user can be an owner of the second communication device 104. The privileged user can have complete access to the second communication device 104. A special user can be a friend, a known person of the privileged user of the second communication device 104, and so on and forth.

The processor 206 is adapted to compare a caller ID information, associated with the incoming call received by the receiver 202, with the pre-defined list of caller ID information which is stored in the memory 204. The caller ID information associated with the incoming call is information assigned within a PSTN. Examples of the caller ID information include, but are not limited to, a telephone number, a mobile phone number, a name, a gender, an address, etc.

The processor 206 is also adapted to responsively present a calling party with customized caller options. The customized caller options are presented as a function of the comparison between the caller ID information associated with the incoming call and the pre-defined list of caller ID information. The calling party can be a user at the first communication device 102. Examples of the customized caller options include, but are not limited to, privileged caller options, special caller options, and default caller options. The privileged caller options are one or more options that are presented to the privileged user. For example, the privileged user is presented with the one or more options which gain the privileged user a direct access to stored recorded messages in the second communication device 104. The privileged can be an owner of the second communication device 104. The privileged user can have complete access to the second communication device 104. The special caller options are one or more options that are presented to the special user. For example, for the special user a pre-recorded message informing the special user where the privileged user is or where else the special user can contact the privileged user is executed. The special user can be a friend, a known person of the privileged user of the second communication device 104, and so on and forth. The default caller options are presented to the calling party when the received incoming call caller ID information is not associated with an entry in the pre-defined list of caller ID information. Examples of the default caller options include, but are not limited to, a greeting message, and a welcome message. The greeting message can be a message in which the privileged user can inform a caller about privileged user's absence and can request the caller to record a message for the privileged user. For example, when the second communication device 104 receives an incoming call from a first communication device 102 and the incoming call is not attended at the second communication device 104 then the calling party at the first communication device 102 can record the voice message at the second communication device 104.

For an embodiment of the present invention, the processor 206 is also adapted to compare the access code with a pre-defined stored list of authorized access codes. The access code is accepted by the receiver 202 from the calling party, for example, from a user at the first communication device 102. Examples of the access code include a numeric code, an alphanumeric code, a sequence of tones, a set of characters, a biometric sample, and the like. The pre-defined stored list of authorized access codes is stored in the memory 204 at the second communication device 104. The pre-defined list of authorized access codes for the second communication device 104 contains one or more caller ID information of one or more privileged users of the second communication device 104 and their respective access codes. The processor 206 is also adapted to present the calling party with customized caller options as a function of the comparison between the accepted access code and the pre-defined stored list of authorized access codes. For example, the processor 206 presents the customized caller options to the first communication device 102.

Figure 3:
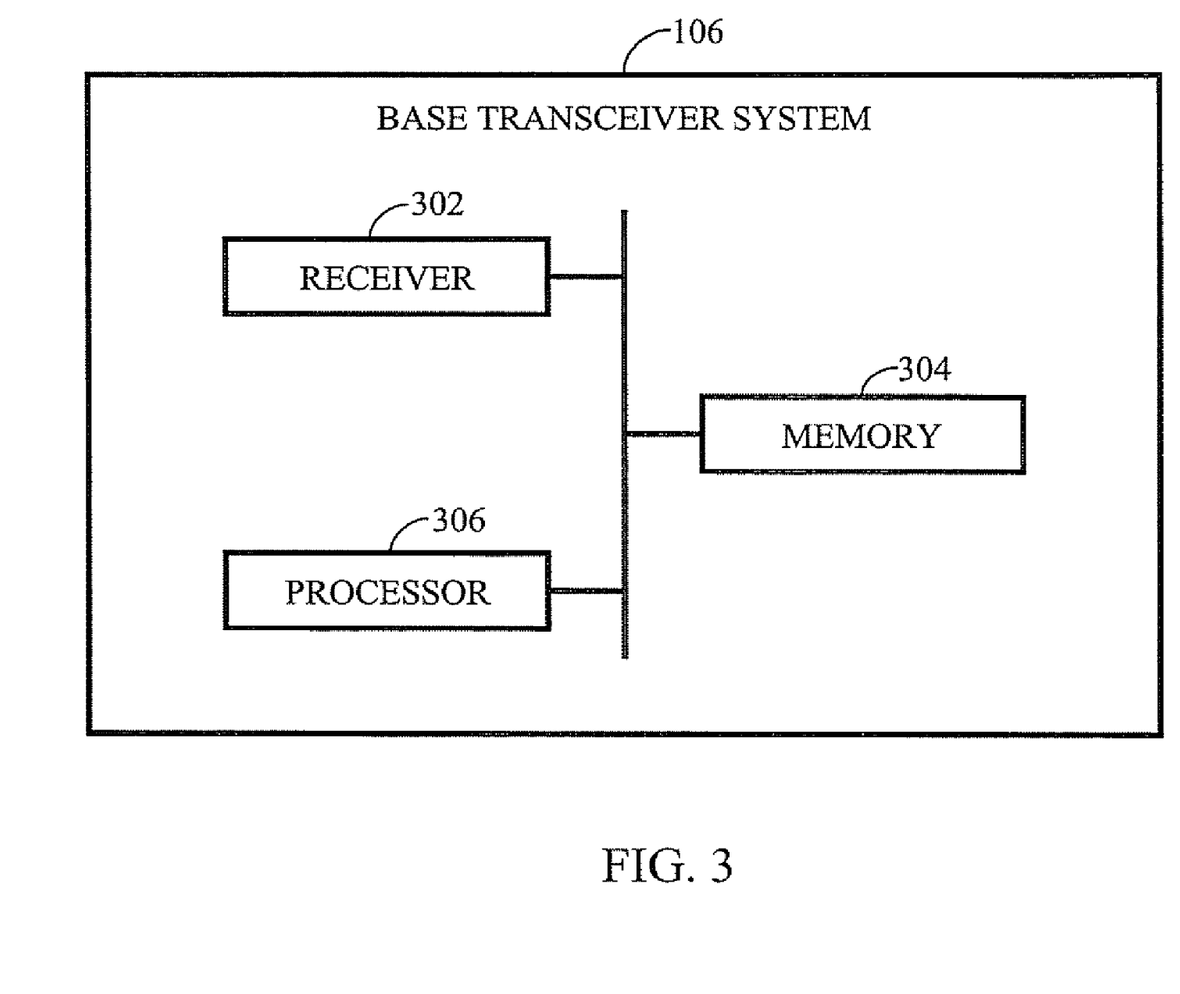
FIG. 3 illustrates a block diagram of an exemplary Base Transceiver System (BTS), in accordance with various embodiments of the present invention.

FIG. 3 illustrates a block diagram of an exemplary Base Transceiver System (BTS) 106, in accordance with various embodiments of the present invention. The BTS 106 aids communication between the first communication device 102 and the second communication device 104 in the communication network 100. For example, the first communication device 102 can transmit a call to the second communication device 104. The call from the first communication device 102 to the second communication device 104 is routed through the BTS 106. The BTS 106 includes a receiver 302, a memory 304, and a processor 306. The receiver 302 is adapted to receive a request for calling a communication device, for example, the first communication device 102. The request for calling the second communication device 104 is received from a calling party. The calling party can be a user at the first communication device 102. The receiver 302 is also adapted to accept an access code from the calling party. The calling party can gain remote access to the communication device by entering an authorized access code. For example, a user at the first communication device 102 can gain remote access to the second communication device 104 by entering an authorized access code. The calling party is authenticated based on the access code at the second communication device 104. Examples of the access code include, but are not limited to, a numeric code, an alphanumeric code, a set of characters, a sequence of tones, and a biometric sample.

The memory 304 stores a pre-defined list of caller ID information. The memory 304 can also store other information, for example, a pre-defined list of authorized access codes, a voice message, customized caller options, and the like. The voice message is a message that is recorded by the calling party, for example, the user at the communication device 102 records the voice message. The pre-defined list of caller ID information can contain at least two classes of caller ID information. Examples of the classes include the privileged user class, the special user class, the ordinary user class, and the like as explained earlier.

The processor 306 is adapted to compare a caller ID information, associated with the call request received by the receiver 302, with the pre-defined list of caller ID information which is stored in the memory 304. The caller ID information associated with the incoming call is information assigned within a PSTN. Examples of the caller ID information include, but are not limited to, a telephone number, a mobile phone number, a name, a gender, an address, etc. The BTS 106 can contain at least one pre-defined list of caller ID information for at least one communication device in the communication network 100. There can be different pre-defined list of caller ID information for the first communication device 102 and the second communication device 104. The pre-defined list of caller ID information can contain at least two classes of caller ID information.

The processor 306 is also adapted to responsively present a calling party with customized caller options. The customized caller options are presented as a function of the comparison between the caller ID information associated with the incoming call and the pre-defined list of caller ID information. The calling party can be a user at the first communication device 102. Examples of the customized caller options include, but are not limited to, privileged caller options, special caller options, and default caller options. The privileged caller options are one or more options that are presented to the privileged user. For example, the privileged user is presented with the one or more options which gain the privileged user a direct access to stored recorded messages in the second communication device 104. The special caller options are one or more options that are presented to the special user. The default caller options are presented to the calling party when the received incoming call caller ID information is not associated with an entry in the pre-defined list of caller ID information.

For an embodiment of the present invention, the processor 306 is also adapted to compare the access code with a pre-defined stored list of authorized access codes for the second communication device 104. The access code is accepted by the receiver 302 from the calling party, for example from a user at the first communication device 102. The calling party is authenticated based on the access code at the second communication device 104. Examples of the access code include a numeric code, an alphanumeric code, a sequence of tones, a set of characters, a biometric sample, and the like. The pre-defined stored list of authorized access codes is stored in the memory 304 at the BTS 106. The pre-defined list of authorized access codes for the communication device contains caller ID information of one or more privileged users of the communication device, for example of the second communication device 104, and their respective access codes. The processor 306 is also adapted to present the calling party with customized caller options as a function of the comparison between the accepted access code and the pre-defined stored list of authorized access codes for the second communication device 104. For example the processor 306 presents the customized caller options to the first communication device 102.

Figure 4:
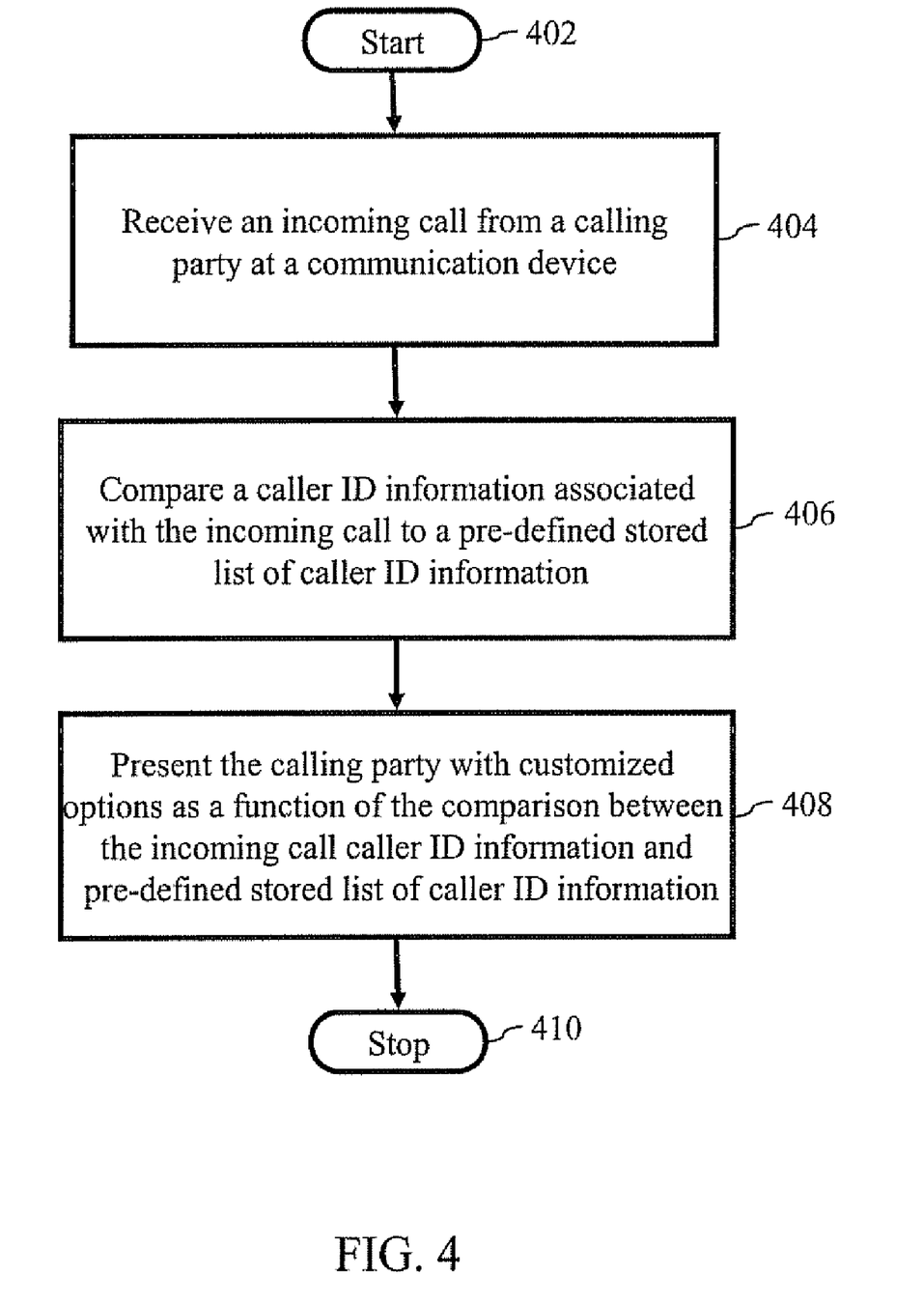
FIG. 4 is a flow diagram illustrating a method for responsively presenting customized caller options via a communication device, in accordance with various embodiments of the present invention.

FIG. 4 illustrates a flow diagram illustrating a method for responsively presenting customized caller options via the second communication device 104, in accordance with various embodiments of the present invention. The method is initiated at step 402. At step 404, the second communication device 104 receives an incoming call from a calling party present at the first communication device 102. The incoming call is received by the receiver 202. At step 406, a caller ID information associated with the incoming call is compared with a pre-defined stored list of caller ID information. The caller ID information associated with the incoming call is information assigned within a PSTN. The processor 204 compares the caller ID information associated with the incoming call with the pre-defined stored list of caller ID information. The caller ID information is compared with the pre-defined stored list of caller ID information when the call is unattended at the second communication device 104. The pre-defined list of caller ID information can contain different classes of the caller ID information such as the privileged user class, the special user class, and the ordinary user class.

At step 408, the calling party is presented with customized caller options as a function of the comparison between the incoming call caller ID information and the pre-defined stored list of caller ID information. The processor 206 presents the customized caller options to the calling party. The customized caller options can be one of the privileged caller options, the special caller options, and the default caller options. The privileged caller options are one or more options that are presented to the privileged user. The special caller options are one or more options that are presented to the special user. The default caller options are presented to the calling party when the received incoming call caller ID information is not associated with an entry in the pre-defined list of caller ID information. Thereafter, the method terminates at step 410.

Figure 5:
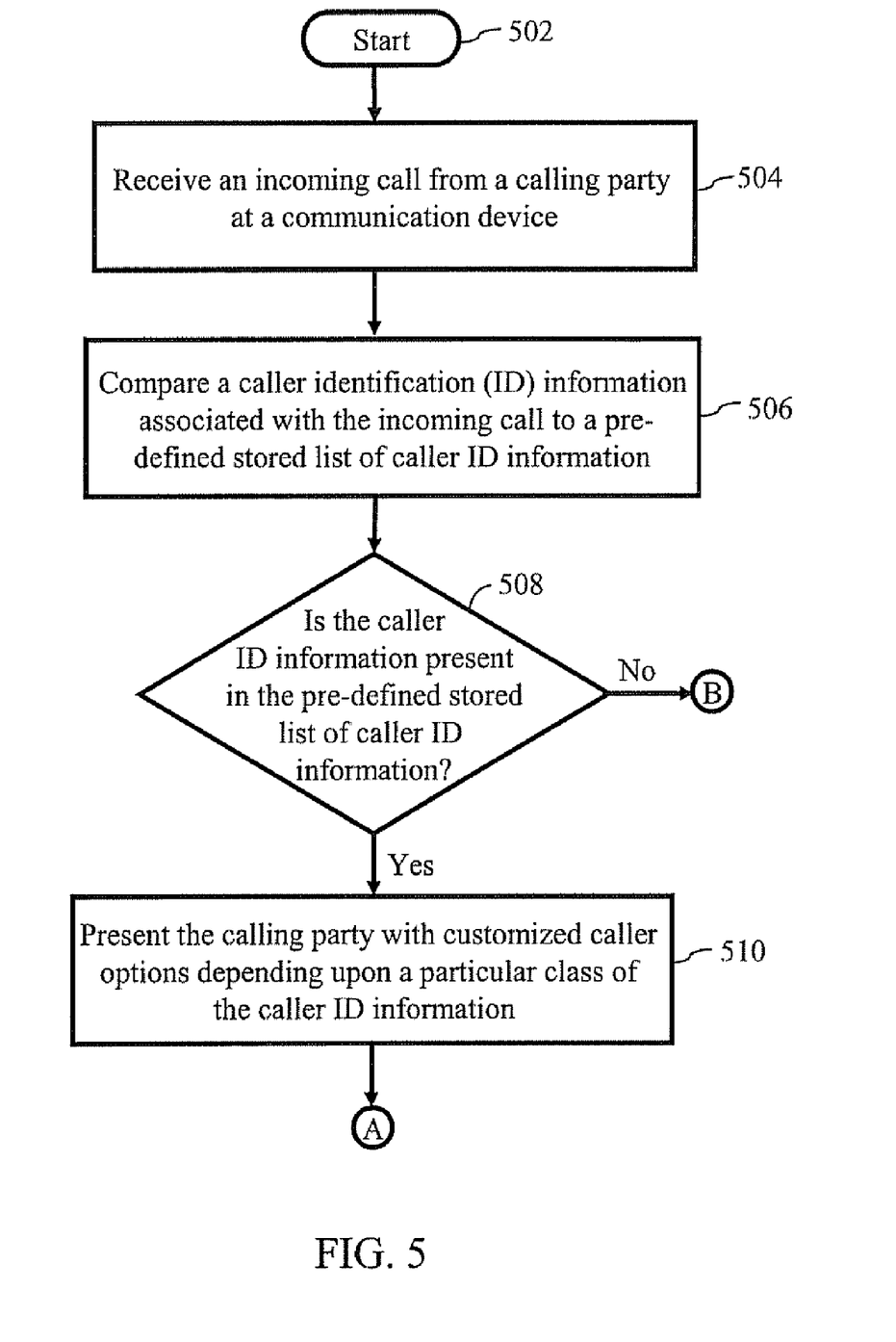
FIGS. 5 and 6 is a flow diagram illustrating a method for responsively presenting customized caller options via a communication device, in accordance with an embodiment of the present invention.
Figure 6:
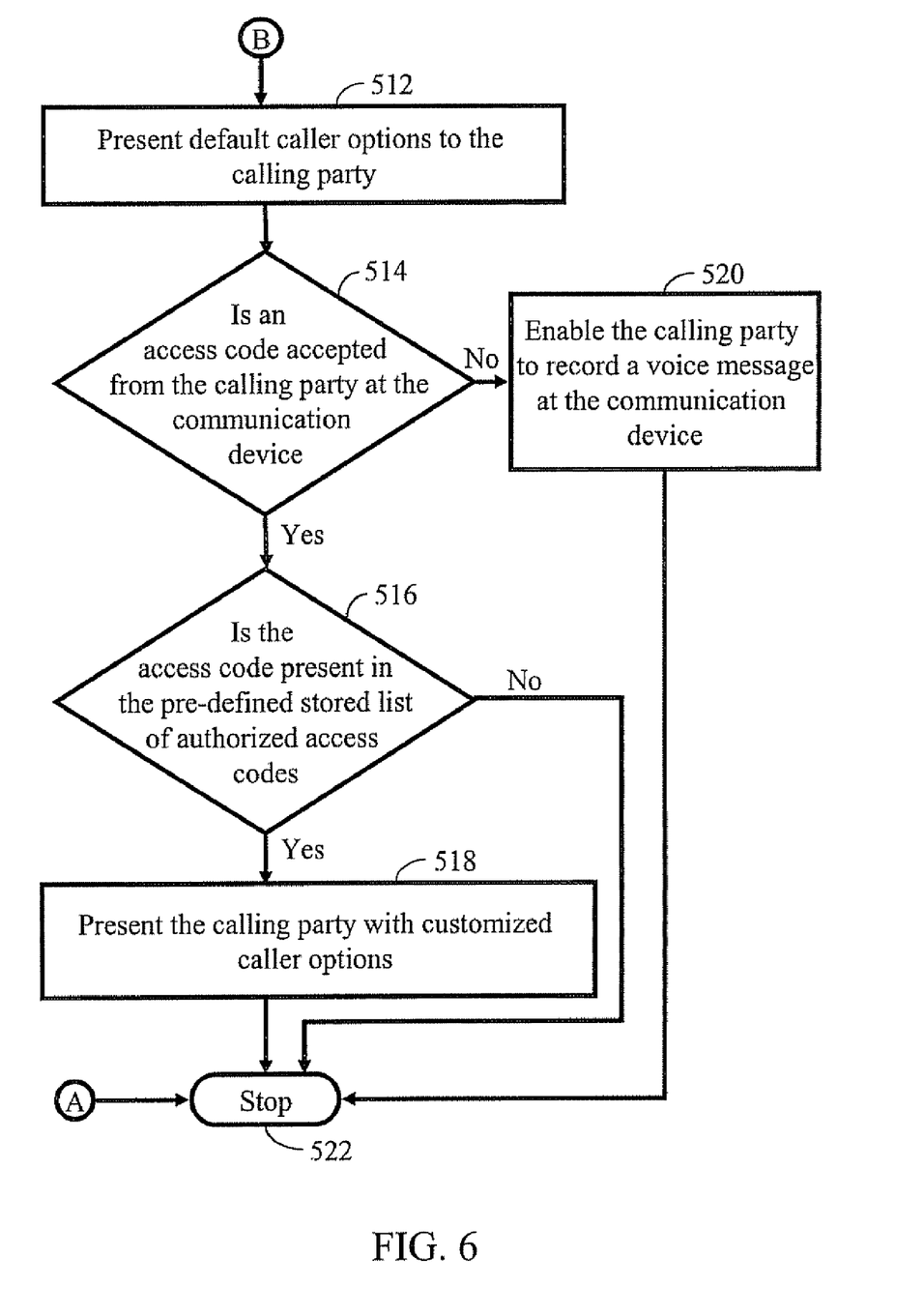

FIGS. 5 and 6 is a flow diagram illustrating a method for responsively presenting customized caller options via the second communication device 104, in accordance with an embodiment of the present invention. The method is initiated at step 502. At step 504, the second communication device 104 receives an incoming call from a calling party present at the first communication device 102. The first communication device 102 transmits the incoming call to the second communication device 104 to access the second communication device 104. The incoming call is received by the receiver 202. At step 506, a caller ID information associated with the incoming call is compared with a pre-defined stored list of authorized caller ID information. The caller ID information is compared with a pre-defined stored list of authorized caller ID information when the call is unattended at the second communication device 104. The caller ID information associated with the incoming call is information assigned within a PSTN. The caller ID information is the information is used to identify a communication device, for example, the first communication device 102. The processor 206 compares the caller ID information of the incoming call with the pre-defined stored list of caller ID information which is stored in the memory 204. The pre-defined stored list of caller ID information contains caller ID information of authorized communication devices.

At step 508, the second communication device 104 checks whether the caller ID information associated with the incoming call from the calling party is present in the pre-defined stored list of caller ID information or not. When the caller ID information of the incoming call is associated with an entry in the pre-defined stored list of caller ID information, at step 510, the customized caller options are presented to the calling party. The method is terminated at step 522 after customized caller options are presented to the calling party. When the caller ID information of the incoming call is not associated with an entry in the pre-defined stored list of caller ID information, then at step 512, default caller options are presented to the calling party by the second communication device 104. At step 514, the second communication device 104 checks if an access code is accepted from the calling party, for example, from a user at the first communication device 102, at the second communication device 104. The access code is entered by the user to gain remote access to the communication device, such as to the second communication device 104. The calling party is authenticated based on the access code at the second communication device 104. At step 516, the second communication device 104 compares the access code with a pre-defined stored list of authorized access codes stored in the memory 204. For an embodiment of the present invention, the pre-defined stored list of authorized access codes can be stored in the memory 304 at the BTS 106. The pre-defined stored list of authorized access codes is for the second communication device 104. The pre-defined stored list of authorized access codes contains authorized caller ID information and their respective access codes. When the access code is associated with an entry in the pre-defined stored list of authorized access codes, at step 518, the customized caller options are presented to the calling party. The customized options are provided by the processor 206. When the access code is not associated with the pre-defined stored list of authorized access codes, then at step 520, the calling party is enabled to record a voice message at the second communication device 104. The voice message is the message recorded by the calling party when the incoming call is not attended at the second communication device 104. Thereafter, the method terminates at step 522.

The embodiments of a method and a system for presenting customized caller options via a communication device offer numerous advantages. The method presents the customized caller options to a calling party based on the automatic identification of caller ID information of an incoming call from the calling party. The caller ID information associated with the incoming call from the calling party is assigned within a PSTN. When the calling party is identified as an owner of the communication device, for example of the second communication device 104, then the owner will be provided with complete access to the communication device directly. Default caller options will not be presented to the owner of the communication device, although the customized caller options will be provided to the owner. When the calling party is unidentified, the default caller options will be presented. The owner can directly access the recorded messages. The recorded messages are recorded by other users for the owner when the call was not attended at the communication device, for example, the second communication device 104. Moreover, the method also does away the need for entering an access code by the calling party each time for gaining remote access to the second communication device 104. Hence the method provides a more secure environment to remotely access the communication device and the chances of hacking of access codes are also reduced.

It will be appreciated that the method and system for presenting customized caller options via a communication device described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method to enable users to view a broadcasted media stream differently. Alternatively, some or all the functions could be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one of ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one of ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for responsively presenting customized caller options via a communication device, the method comprising:
   receiving an incoming call from a calling party at the communication device;
   comparing a caller Identification (ID) information associated with the incoming call to a pre-defined stored list of caller ID information;
   presenting the calling party with customized caller options as a function of the comparison between the incoming call caller ID information and the pre-defined stored list of caller ID information; and
   responding to a privileged user being identified, by granting the privileged user access to listen to recorded messages, recorded by other users, without using an access code or playing pre-recorded messages.

2. The method recited in claim 1, wherein the caller ID information associated with the incoming call comprises a telephone number.

3. The method recited in claim 1, wherein the caller ID information associated with the incoming call comprises a name.

4. The method recited in claim 1, wherein the caller ID information associated with the incoming call is assigned within a Public Switched Telephone Network (PSTN).

5. The method as recited in claim 1, wherein the pre-defined stored list of caller ID information comprises at least two classes of caller ID information.

6. The method as recited in claim 5, wherein the customized caller options are different depending upon a particular class of caller ID information associated with the incoming call caller ID information.

7. The method as recited in claim 1 further comprising:
   presenting default caller options to the calling party when the received incoming call caller ID information is not associated with an entry in the pre-defined stored list of caller ID information.

8. The method as recited in claim 7 further comprising:
   enabling the calling party to record a voice message at the communication device.

9. The method as recited in claim 7 further comprising:
   accepting an access code from the calling party at the communication device;
   comparing the access code with a pre-defined stored list of authorized access codes; and
   presenting the calling party with customized caller options as a function of the comparison between the accepted access code and the pre-defined stored list of authorized access codes.

10. The method as recited in claim 9, wherein the access code can be at least one of a set of characters, a sequence of tones and a biometric sample.

11. A communication device comprising:
    a receiver adapted to receive an incoming call from a calling party;
    a memory storing a pre-defined list of caller Identification (ID) information; and
    a processor adapted to:
      compare a caller ID information associated with the incoming call to the pre-defined list of caller ID information stored in the memory, to responsively present the calling party with customized caller options as a function of that comparison, and to respond to a privileged user being identified, by granting the privileged user access to listen to recorded messages, recorded by other users, without using an access code or playing pre-recorded messages.

12. The communication device as recited in claim 11, wherein the caller ID information comprises a telephone number.

13. The communication device as recited in claim 11, wherein the caller ID information comprises a name.

14. The communication device as recited in claim 11, wherein the caller ID information associated with the incoming call is assigned within a Public Switched Telephone Network (PSTN).

15. The communication device as recited in claim 11, wherein the pre-defined list of caller ID information which is stored in the memory comprises at least two classes of caller ID information.

16. The communication device as recited in claim 15, wherein the customized caller options are different depending upon a particular class of caller ID information associated with the incoming call caller ID information.

17. A Base Transceiver Station (BTS) comprising:
- a receiver adapted to receive a request for calling a communication device from a calling party;
- a memory storing a pre-defined list of caller identification (ID) information; and
- a processor adapted to compare a caller ID information associated with the call request to the predefined list of caller ID information stored in the memory, to responsively present the calling party with customized caller options as a function of that comparison, and to respond to a privileged user being identified, by granting the privileged user access to listen to recorded messages, recorded by other users, without using an access code or playing pre-recorded messages.

18. The BTS as recited in claim 17, wherein the caller ID information comprises a telephone number.

19. The BTS as recited in claim 17, wherein the caller ID information comprises a name.

20. The BTS as recited in claim 17, wherein the caller ID information associated with the call request is assigned within a Public Switched Telephone Network (PSTN).

21. The BTS as recited in claim 17, wherein the pre-defined list of caller ID information which is stored in the memory comprises at least two classes of caller ID information.

22. The BTS as recited in claim 21, wherein the customized caller options are different depending upon a particular class of caller ID information associated with the incoming call caller ID information.

* * * * *